Figure 1:
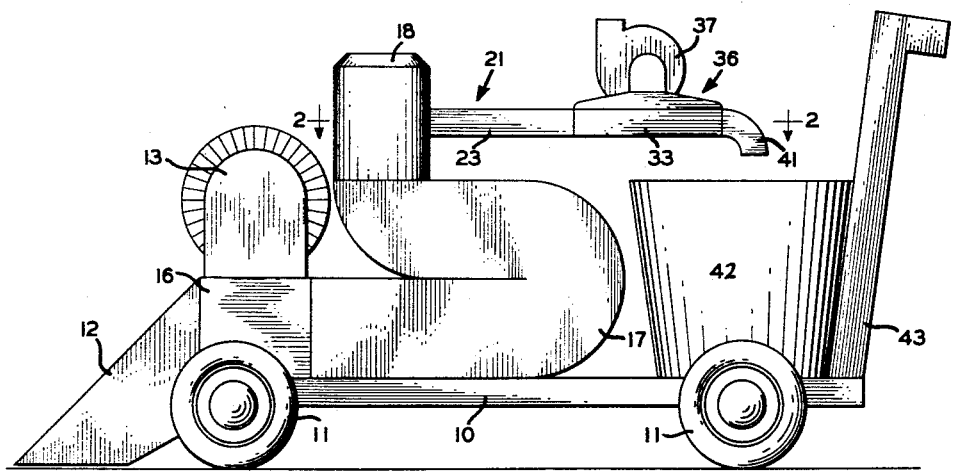

June 28, 1960   M. A. KOSCH   2,942,976
METHOD OF PELLETING ROUGHAGE CROPS
Filed April 21, 1958

INVENTOR.
MAX A. KOSCH
BY
*Harold B. Hood*
ATTORNEY

United States Patent Office 2,942,976
Patented June 28, 1960

2,942,976

METHOD OF PELLETING ROUGHAGE CROPS

Max A. Kosch, Columbus, Nebr., assignor to Kosch Co., Columbus, Nebr., a corporation of Nebraska Filed Apr. 21, 1958, Ser. No. 729,940

9 Claims. (Cl. 99—8)

This invention relates to a method of forming hay or other roughage crops into a compressed, firm shape and perhaps finds its primary utility in the forming of alfalfa and similar crops, used for making hay, into pellets having a density within the approximate range of forty to sixty pounds per cubic foot and having a rectangular shape in the vicinity of one inch by one inch by two inches.

At present, many alfalfa dehydrating plants process alfalfa meal into pellets using the same type of pellet mill that is used to pellet chicken feed and other kinds of feed made from a mixture of ground grains and concentrates. The ground meal is forced through holes in a ring type die by rollers inside the die while the compacted and extruded mixture is cut from the outside of the revolving ring by a stationary knife. This type of mill works satisfactorily with ground meal, but will not work satisfactorily on roughage material, such as unground alfalfa. When unground alfalfa is pelleted by such a mill, the mill itself reduces the alfalfa to a consistency similar to ground alfalfa before pelleting. This is an inefficient operation at best and does not give a true roughage pellet but rather a pellet similar in nature to one produced with a ground mill charge. In certain applications, such as, for example, the feeding of milking cows, roughage is needed to maintain the chemistry balance of the cow's stomach in a condition suitable for high butter fat production.

It is therefore an object of the present invention to provide a process by which roughage material such as hay in an unground state may be formed into pellets.

Obviously, the forming of either ground hay or unground hay into pellets having a density of perhaps fifty pounds per cubic foot would reduce the subsequent handling cost and storage space required as compared with conventional methods of handling and storing hay, such as, for example, the conventional baling operation. In the past, however, pelleting of hay has been restricted to the above described stationary type of plant and has not been accomplished by a transit type of pelleting machine in the nature of a transit type hay baler. One of the difficulties in the design of a transit type hay pelleter is the tremendous forces or pressures required to produce a stable and durable pellet when using conventional pelleting processes. Pressures in the vicinity of four thousand pounds per square inch have been found to be necessary and, even then, the results are not consistent, especially in a process where the pressure is not maintained for at least a few seconds.

It is therefore a further object of the present invention to provide an improved process for the forming of hay pellets in which relatively low pressures are sufficient to form a stable and durable hay pellet.

Another object of the present invention is to provide a process in which large particle forage is formed into pellets and in which relatively low pressures are sufficient to form a stable and durable pellet.

Still further objects of the present invention will appear as the description proceeds.

To the accomplishment of the above and related objects, my invention may be embodied in the steps described in the following specification, and illustrated in the accompanying drawings, attention being called to the fact, however, that the specific procedure described and illustrated is by way of illustration only and that changes may be made therein, so long as the scope of the appended claims is not violated.

Figure 2:
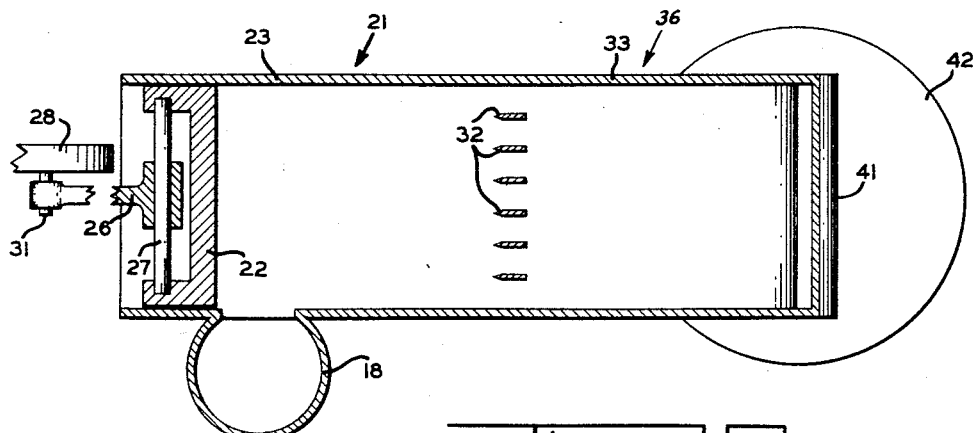

Fig. 1 depicts schematically a transit type apparatus usable for practicing the process embodying the present invention; and Fig. 2 is a somewhat schematic section along the line 2—2 of Fig. 1.

It will be seen that I have illustrated a transit type of apparatus which, as I will describe below, may be used to practice the process which embodies my invention; however, it should be noted that, even though the invention is described as an operation of the disclosed apparatus, various other types of apparatus may be used to practice the process and may or may not include all the elements described as a part of the disclosed apparatus.

Referring now to Fig. 1, it will be seen that I have illustrated a transit type of apparatus having a base 10 with wheels 11 rotatably secured thereto. A cutter pickup or pick-up head 12 extends downwardly from one end of the apparatus and the apparatus may be drawn leftwardly, as viewed in Fig. 1, so that a crop may be mowed and picked up (in the case of the cutter pick-up) or may be picked up (in the case of the pick-up head and where the crop has already been mowed). The cutter or pick-up head 12 is conventional and will not be further described, inasmuch as its details form no part of the present invention.

A conventional burner or gas turbine is indicated by the numeral 13 and is shown mounted above a conventional chopper or hammer mill 16 which is secured to the base 10. The hay passes from the cutter or pick-up head 12 into the chopper or hammer mill 16 where the hay is reduced to short lengths before being dehydrated in a dehydrator 17. A conventional hammer mill equipped with a coarse screen is probably preferable to a chopper in that it would not only break the hay into short pieces, but would also shred the stems of coarse hay, thus making the material more uniform for a more uniform dehydration.

The details of the chopper or hammer mill 16, the dehydrator 17 and the burner or gas turbine 13, which provides heated air to the dehydrator 17 for dehydrating the hay, will not be described inasmuch as they form no part of the present invention. The dehydrator 17 with the associated burner or gas turbine 13 should be capable of reducing the moisture content of the hay from around 70% by weight (as in green hay) to a value in the range of from 5% to 30% by weight.

In the situation that the apparatus is used with a pick-up head to operate upon wilted hay which has dried in windrows in the field, the capacity of the dehydrator 17 would not need to be as great or, alternatively, would not be completely used. Thus, the machine could be used to dehydrate and pellet green hay for a "once over" operation to save the maximum possible amount of vitamin A and carotene, but at the expense of using a large quantity of fuel for the dehydrator. Or it could be used to pick up wilted hay to increase the capacity of the dehydrator resulting in the use of less fuel per ton of product but at the expense of a greater loss of vitamin A and carotene.

The dehydrator 17 heats the hay to a temperature somewhere above approximately 160° F. but not greater than approximately 212° F. or the boiling temperature of water. The 212° F. temperature should not be exceeded because a certain amount of moisture should remain in the partially dried hay. It has been found that a moisture content in the range of from 5-30% by weight seems to give the best adhesion of the hay in the final pelleted product.

The thus heated hay passes out of the dehydrator 17 into a conventional hay-air separator 18, which may be mounted upon the dehydrator 17. The hay is charged from the hay-air separator 18 into a compacting means, indicated generally by the numeral 21. This charging operation may be accomplished in a manner similar to the charging of a conventional baler and may be accomplished in cycles, that is, a piston 22 rams the hay rightwardly as viewed in Fig. 2 and is then retracted. Hay is then charged into the leftward end of a conduit 23, a portion of which forms a part of the compacting means 21. This cycle is repeated again and again causing compacted hay to move rightwardly, as viewed in Figs. 1 and 2, in the conduit 23.

The heating of the hay to temperatures above 160° F., in the dehydrating step as above-described causes the hay to be reduced to a plastic consistency readily allowing the large fibers of hay to quickly conform and maintain the irregular patterns required in the compressed final pelleted product. By heating the hay to temperatures in the range of 160° F.–200° F., the pressures used in the compacting step need only be as great as approximately 100 p.s.i. to 300 p.s.i. instead of the much higher 4,000 p.s.i. normally required in previously used pelleting operations. I have found, however, that in the case of pressures close to 100 p.s.i., somewhat higher temperatures around 200° F. are necessary to give a properly compacted product. When temperatures close to 160° F. are used, pressures close to or above 300 p.s.i. are necessary to give a properly compacted product.

The piston 22 is reciprocable in the conduit 23 and has a pitman 26 pivotally connected to it by means of a pin 27. Reciprocating motion of the piston 22 is provided from a suitable rotary drive means (not shown) which rotates a drive wheel 28 pivotally connected to the pitman 26 by means of a pin 31 fixed to the drive wheel 28 near the periphery thereof.

As was above mentioned, the pressures necessary to sufficiently compact the hay to form a stable and durable pellet are approximately 100 p.s.i.–300 p.s.i. and the piston 22 should produce such a pressure at the end of its ram stroke. In the case of the apparatus disclosed herein, however, pressures in the range of 300–500 p.s.i. are necessary for the following reason: a plurality of knives 32—32 are spaced transversely across and secured to the upper and lower surfaces of the conduit 23 with their cutting edges projecting toward the entrance end of the conduit 23. The added force required to force the compacted hay past these knives makes necessary the additional ram pressure. As the compacted hay is forced rightwardly as viewed in Fig. 2, it parts at the leading edges of the knives 32—32, flows between and outside them and again comes in contact beyond the trailing edge of the knives.

Although I do not wish to restrict myself to the following sizes, I have found that apparatus for accomplishing my process will operate satisfactorily if the dimensions between the knives are from one to two inches and the vertical inside dimension of the compacting portion of the conduit 23 is approximately one inch. The amount of hay which is charged into the conduit 23 before each ramming operation is of a sufficient amount that, when compacted, its dimension longitudinally of the conduit 23, is approximately one inch. As will be explained below, the shape or plank which is formed by the above described operation is broken between the original charges of hay and also separates where previously partitioned by the knives 32, 32, thus forming pellets which have dimensions one inch by one inch by two inches (assuming that the knives are spaced two inches apart).

The section 33 of the conduit 23 which is beyond the knives 32—32 is a portion of a cooling means, indicated generally by the numeral 36 because within the section 33 the compressed material is cooled. The section 33 is so proportioned and arranged that the pressure created within the hay by the compacting means 21 is partially maintained so that the pressure within the hay passing through this section is approximately 50 p.s.i. Suitable means such as conventional springs exerting spring pressure upon the sides of the section 33, which sides could be made movable transversely of the direction of movement of the hay, might be incorporated in the device to restrict the passage of hay through section 33 so as to maintain pressure therein.

Referring to Fig. 1, the cooling means 36 comprises the section 33 of the conduit 23 and also a cooling air blower 37 secured upwardly of the section 33 of the conduit 23. Even though the hot compacted hay being forced rightwardly through the section 33 is quite dense, it is sufficiently porous to allow the cooling air blower 37 to suck air through the hay causing it to be cooled at least to a temperature of approximately 115° F. before it reaches a curved deflector portion 41 at the far rightward end of the conduit 23. It has been found that about two pounds per square inch of pressure drop acting for a period of one minute is sufficient to cool the hay down to the 115° F. temperature. It should be noted that the heated hay plank passing out of the compacting means 21 should be maintained in the shape which it has as it exits from the compactor 21 until it has been cooled at least to a temperature of approximately 115° F. because not until it reaches this temperature does the compressed shape of the hay become firm enough to withstand handling. The section 33 of conduit 23, a track with rollers or any suitable means may be provided for maintaining it in this shape until sufficient cooling has been accomplished.

It should be noted that compacting of heated hay having a temperature above 160° F. and cooling of the compressed hay while maintaining it in the desired shape are probably the two most important elements of the process which embodies my invention, because they insure that the hay will retain a compressed, firm shape even though the compacting pressures used are relatively low. The discovery of these properties makes the design of a transit type hay pelleter relatively simple inasmuch as means capable of exerting pressures of the nature of 4,000 p.s.i. need no longer be provided. It should further be noted that compacting hay heated to above 160° F. and then cooling the compressed hay while maintaining it in the desired shape insures a stable and durable pelleted product even though the compacting pressures are maintained for as short a time as one second, whereas in previous processes the compacting pressures had to be maintained a substantially longer period and even then results were not consistent.

When the thus formed plank of hay reaches the curved deflector portion 41 of the conduit 23, it will be forced against the portion 41 and broken along the planes of least resistance which are the planes extending transversely across the plank of compressed hay between the original charges of hay. As the compressed hay drops from the conduit 23 into a carrying bin 42 mounted upon the base 10, it separates along the partitions produced by the knives 32—32 and breaks along the planes between the original charges of hay producing a plurality of compressed firm pellets having a density somewhere in the range of approximately 40 to approximately 60 pounds per cubic foot and having rectangular shapes with dimensions of one inch by one inch by two inches. An unloading elevator 43 may be provided for moving the pellets out of the carrying bin 42 into a truck or storage means.

It should be noted that satisfactory pellets can be produced by heating to temperatures less than 160° F., however, in such a case correspondingly higher pressures must be used for pelleting and correspondingly higher pressures must be maintained during cooling. However, when temperatures under 160° F. are used, cooling while under pressure becomes less effective in producing a satisfactory pellet. Therefore, at least in its preferred form, my invention includes the heating of hay to temperatures at least as high as 160° F. before pelleting.

My process has been described above as including a chopping or hammer milling step. In many situations such a step is desirable in the forming of satisfactory pellets because it makes possible more effective dehydration of the hay; however, it should be noted that my method does not disturb the particles other than to crowd them together. Therefore, because it is not necessary to grind the hay in my process, it will be possible in certain situations to take sun cured or dehydrated hay and move it directly into a heater and pelleter without chopping or hammer milling, thus reducing the amount of hay in process at a given moment and also reducing the size of a machine for accomplishing such a process.

Experiments have verified that certain other alternatives of my process are also feasible. For example, unheated hay or hay cooled after dehydrating may be subjected to high heat of short duration and then immediately pelleted. The hay should be heated only long enough for the outer fibres to become hot while the fibres in the core remain cool. At least a portion of the pelleting pressure is maintained until the cooling to approximately 115° F. of the outer fibres results by internal temperature adjustment with the fibres in the core. The result of such a process is to provide an outer layer of compacted hay which maintains the desired shape of the hay mass. Obviously, less heat would be required in such a process and less hay would be in process at one time, thus making possible design of a smaller machine for the same output.

I claim as my invention:

1. A method of forming hay into a compressed firm shape comprising heating the hay to a temperature between approximately 160° F. and 212° F., forming the heated hay into the desired shape while simultaneously subjecting it to pressure, and maintaining the hay in the desired shape during cooling thereof.

2. A method of forming hay into a stable, self-sustaining, compressed firm shape comprising heating the hay to a temperature between approximately 160° F. and 212° F., and forming the heated hay into the desired shape while simultaneously subjecting it to pressure in the approximate range of 100 to 500 p.s.i.

3. A method of forming hay into a stable, self-sustaining, compressed firm shape comprising heating the hay to a temperature between approximately 160° F. and the boiling temperature of water, and forming the heated hay into the desired shape while simultaneously subjecting it to a pressure of at least approximately 300 p.s.i.

4. A method of forming hay into a stable, self-sustaining, compressed firm shape comprising heating the hay to a temperature between approximately 200° F. and the boiling temperature of water, and forming the heated hay into the desired shape while simultaneously subjecting it to a pressure of at least approximately 100 p.s.i.

5. A method of forming hay into a compressed firm shape comprising heating the hay to a temperature between approximately 160° F. and approximately 212° F., forming the heated hay into the desired shape while simultaneously subjecting it to a pressure of at least approximately 300 p.s.i., and cooling the hay below approximately 115° F. while maintaining it in the desired shape.

6. A method of forming hay into a compressed firm shape comprising breaking the hay down into relatively short lengths, dehydrating the hay until its moisture content is in the range of 5–30% by weight, heating the hay to a temperature between approximately 160° F. and approximately 212° F., forming the heated hay into the desired shape while simultaneously subjecting it to a pressure of at least approximately 300 p.s.i., and cooling the hay below approximately 115° F. while maintaining it in the desired shape.

7. A method of forming hay into compressed firm pellets comprising heating the hay to a temperature between approximately 160° F. and approximately 212° F., introducing charges of substantially uniform quantities of the heated hay successively into a travel path, intermittently exerting against the most recently introduced charge a force tending to advance said most recently introduced charge against previously-introduced charges while concurrently exerting upon all of said charges currently disposed in said travel path compacing forces generally transverse with respect to the line of such advance and effective to resist the advancement of the hay along said travel path, said forces cooperating to advance the hay longitudinally of said travel path and to produce pressures within the hay of at least approximately 300 p.s.i., cooling the hay to approximately 115° F. while simultaneously maintaining the shape which the hay is in as it leaves said travel path, and breaking the hay shape transversely of said line of advance between the original hay charges to form pellets of hay.

8. A method of forming hay into compressed firm pellets comprising hammer milling the hay into relatively short shredded lengths, dehydrating the hay until its moisture content is in the range of 5–30% by weight, heating the hay to a temperature between approximately 160° F. and approximately 212° F., introducing charges of substantially uniform quantities of the heated hay successively into a travel path, intermittently exerting against the most recently introduced charge a force tending to advance said most recently introduced charge against previously-introduced charges while concurrently exerting upon all of said charges currently disposed in said travel path compacting forces generally transverse with respect to the line of such advance and effective to resist the advancement of the hay along said travel path, said forces cooperating to advance the hay longitudinally of said travel path and to produce pressures within the hay of at least approximately 300 p.s.i., cooling the hay as it leaves said travel path to approximately 115° F. while simultaneously maintaining the shape which the hay is in as it leaves said travel path, and breaking the hay shape transversely of said line of advance between the original hay charges to form pellets of hay.

9. A method of forming hay into compressed firm pellets comprising hammer milling the hay into relatively short shredded lengths, dehydrating the hay until its moisture content is in the range of 5–30% by weight, heating the hay to a temperature between approximately 160° F. and approximately 212° F., introducing charges of substantially uniform quantities of the heated hay successively into a travel path, intermittently exerting against the most recently introduced charge a force tending to advance said most recently introduced charge against previously-introduced charges while concurrently exerting upon all of said charges currently disposed in said travel path compacting forces generally transverse with respect to the line of such advance and effective to resist the advancement of the hay along said travel path, said forces cooperating to advance the hay longitudinally of said travel path and to produce pressures within the hay of between approximately 300 to approximately 500 p.s.i., longitudinally slicing the compacted mass of hay as it advances along said travel path, cooling the hay to approximately 115° F. by passing air therethrough while simultaneously maintaining the shape which the hay is in as it exits from the conduit, and breaking the hay shape transversely between the original charges to form pellets of hay.

References Cited in the file of this patent

UNITED STATES PATENTS

| | | |
|---|---|---|
| 422,370 | Brott | Mar. 4, 1890 |
| 1,003,525 | Von Skorzewski | Sept. 19, 1911 |
| 1,551,427 | Pfister | Aug. 25, 1925 |